Patented July 17, 1928.

1,677,831

UNITED STATES PATENT OFFICE.

ERICH KRAUSE, OF CONSTANCE, GERMANY, ASSIGNOR TO THE FIRM OF HOLZVERK-OHLUNGS-INDUSTRIE AKTIENGESELLSCHAFT, OF CONSTANCE, BADEN, GERMANY, A CORPORATION OF GERMANY.

PROCESS FOR THE CHLORINATION OF METHANE.

No Drawing. Application filed January 6, 1923, Serial No. 611,181, and in Germany March 27, 1922.

The known methods for the chlorination of methane by treatment with chlorine at higher temperatures require, in order to avoid explosions, the use of diluting agents such as for instance carbon dioxide, nitrogen or the excess of one of the reaction components. The working with such diluting agents requires a relatively high reaction temperature and results in increased heat consumption and facilitates the formation of large quantities of less valuable more highly chlorinated products. A further disadvantage of these known methods is that the separation of the chlorination products, especially of the valuable methyl chloride, from the gases of reaction can be carried out only with difficulty and with unavoidable losses.

It has been discovered that it is possible to carry through the chlorinating process without any difficulty and without any danger of explosion by treating methane with pentachloride of antimony. In comparison with the chlorinating methods working with free chlorine the improved process according to this invention possesses various advantages. The relation of methane to pentachloride of antimony or the quantities of methane to be worked through can be varied within any limits, the process being thus influenced with regard to the formation of desired products of chlorination without any danger of explosion. A further advantage is that, in comparison with the above mentioned chlorinating processes, it is possible to work at lower temperatures, for instance at temperatures from 290–350° C. whereby, the formation of more highly chlorinated products is diminished in favor of the formation of the specially desired methyl chloride.

The process can be carried out without assistance of catalyzers. The presence of catalyzers adapted for the carrying through of such chlorinizing reactions, for instance the chlorides of copper, iron, calcium which are preferably precipitated upon substances presenting a large surface, such as charcoal, refracting clay, pumice stone or the like, permits a further lowering of the temperature for instance to 250° C. or less. In carrying out the improved process pentachloride of antimony in quantities to be regulated is introduced into the reaction vessel filled with distributing bodies, for instance of refractory clay, pumice stone or the like, methane being introduced at the same time in being heated to the required temperature of reaction for instance 300–350° C. The pentachloride and the methane can be conducted through the vessel for the reaction either in the same direction or in opposite directions. The trichloride of antimony formed in the course of the process is preferably condensed in a receptacle, retransformed by chlorination into pentachloride and as such conducted back into the process. The products from the methane chlorination are recovered in the well known manner.

Examples.

(1.) A quartz tube was filled with loose pieces of chamotte and at a temperature of 300° C. methane and pentachloride of antimony were introduced. The admission of methane was regulated by a gas flow meter; the pentachloride of antimony flowed out of a burette through a drop-counter into the reaction-tube.

From 0.546 mol. of methane and 0.2 mol. of pentachloride of antimony the following products were obtained: 0.0948 mol. of methyl chloride, 0.0073 mol. of methylene chloride and 0.0026 mol. of chloroform. Calculated with respect to the quantity of methane which has really gone into reaction 90.5% $CH_3Cl$, 7% $CH_2Cl_2$, 2.5% $CHCl_3$.

(2.) From 0.169 mol. of methane and 0.176 mol. of pentachloride of antimony there have been obtained; 0.0384 mol. $CH_3Cl$, 0.017 mol. $CH_2Cl_2$, 0.006 mol. $CHCl_3$ and some $CCl_4$. Calculated upon the quantity of methane introduced this is equal to 22.8% $CH_3Cl$, 10% $CH_2Cl_2$, 3.5% $CHCl_3$: or of the quantity of methane which has really gone into reaction 62.4% $CH_3Cl$, 27.7% $CH_2Cl_2$ and 9.7% $CHCl_3$.

(3.) In the presence of $CuCl_2$ as catalyzer and at a reaction temperature of 285° C. there have been obtained from 0.41 mol. of methane and 0.124 mol. of pentachloride of antimony: 0.0682 $CH_3Cl$, 0.0013 mol. $CH_2Cl_2$ and 0.0005 mol. $CHCl_3$. Calculation upon the quantity of methane introduced this means 16.7% $CH_3Cl$, 0.3% $CH_2Cl_2$ and 0.1% $CHCl_3$; or of the quantity of methane which has really gone into reaction: 97.4% $CH_3Cl$, 1.9% $CH_2Cl_2$ 0.7% $CHCl_3$.

The applicability of pentachloride of antimony for certain purposes of chlorination, for instance, for the addition of chlorine to unsaturated compounds is known. Chlorine compounds of acetylene have for instance already been produced by introducing acetylene into liquid pentachloride of antimony and by subsequent decomposition of the double compound thus formed. From such additive reactions, which are known to take place very smoothly, it could not be inferred that the pentachloride of antimony is specially adapted for the chlorination of methane which is a matter of chlorine substitution. Such a conclusion was even less admissible as according to older publications pentachloride of phosphorus and of antimony did not act at all upon methane. The discovery that pentachloride of antimony at high temperatures (for instance at about 300° C.) is an excellent means for the chlorination of methane and presents special advantages, is therefore quite surprising. That the use of pentachloride of antimony for this purpose was not evident is proved by the fact that this substance has been used as catalyzer in the chlorination of methane with free chlorine, without suggesting to any one the fact that methane can be chlorinated with pentachloride of antimony alone with excellent results.

It has already been proposed to use phosgene as means for chlorinating methane. This has, however, the inconvenience that the gaseous carbon oxide originating from the phosgene is admixed with the waste gases, whereby the separation of the products of chlorination from the methane in excess is rendered very difficult, the regenerating of the phosgene encountering serious difficulties. The process according to this invention permits the easy separation of the products from reaction and the easy transformation of the trichloride of antimony into pentachloride, this latter substance being adapted to be always used again for the chlorinating of new quantities of methane.

Claims:

1. In the process of chlorinating methane, the step which comprises reacting methane with antimony pentachloride.

2. In the process of chlorinating methane, the step which comprises reacting methane with antimony pentachloride in the presence of chlorination catalysts.

3. In the process of chlorinating methane, the step which comprises reacting methane with antimony pentachloride at temperatures between 250°–350° C.

4. In the process of chlorinating methane, the step which comprises reacting methane with antimony pentachloride at temperatures between 250°–350° C. and in the presence of chlorination catalysts.

In testimony whereof I affix my signature.

ERICH KRAUSE.